(12) United States Patent
Yokota et al.

(10) Patent No.: US 8,475,917 B2
(45) Date of Patent: Jul. 2, 2013

(54) FLUORORUBBER-METAL LAMINATE SHEET

(75) Inventors: Atsushi Yokota, Kanagawa (JP); Toshihiro Higashira, Kanagawa (JP); Yasuaki Kitajima, Kanagawa (JP)

(73) Assignee: NOK Corporation, Tokyo (JP)

( * ) Notice: Subject to any disclaimer, the term of this patent is extended or adjusted under 35 U.S.C. 154(b) by 183 days.

(21) Appl. No.: 13/058,902

(22) PCT Filed: Aug. 27, 2009

(86) PCT No.: PCT/JP2009/064905
§ 371 (c)(1),
(2), (4) Date: Feb. 14, 2011

(87) PCT Pub. No.: WO2010/029851
PCT Pub. Date: Mar. 18, 2010

(65) Prior Publication Data
US 2011/0143124 A1    Jun. 16, 2011

(30) Foreign Application Priority Data
Sep. 9, 2008  (JP) .................................. 2008-230514

(51) Int. Cl.
*B32B 15/06*  (2006.01)
*B32B 25/14*  (2006.01)

(52) U.S. Cl.
USPC ............................ 428/323; 428/421; 428/457

(58) Field of Classification Search
None
See application file for complete search history.

(56) References Cited

U.S. PATENT DOCUMENTS

| | | | |
|---|---|---|---|
| 5,700,861 A * | 12/1997 | Tomihashi et al. | 524/344 |
| 6,764,763 B1 * | 7/2004 | Tomihashi et al. | 428/375 |
| 2007/0293644 A1 * | 12/2007 | Morikawa et al. | 526/247 |

FOREIGN PATENT DOCUMENTS

| | | |
|---|---|---|
| JP | 61-012741 | 1/1986 |
| JP | 08-109368 | 4/1996 |
| JP | 10-060411 | 3/1998 |
| JP | 2004-068886 | 3/2004 |
| JP | 2005-226064 | 8/2005 |
| JP | 2007-186536 | 7/2007 |
| JP | 2007-277340 | 10/2007 |

OTHER PUBLICATIONS

Machine translation of JP 2007-186536, Jul. 2007.*
Machine translation of JP 10-60411, Mar. 1998.*
International Preliminary Report on Patentability and Written Opinion from corresponding PCT application No. PCT/JP2009/064905 dated Apr. 28, 2011, 8 pgs.
International Search Report from corresponding PCT application No. PCT/JP2009/064905 dated Nov. 2, 2009, 4 pgs.

* cited by examiner

*Primary Examiner* — Ramsey Zacharia
(74) *Attorney, Agent, or Firm* — Brinks Hofer Gilson & Lione

(57) ABSTRACT

A fluororubber-metal laminate sheet, which comprises a metallic sheet and a vulcanized fluorocarbon layer, provided on the metallic sheet by applying thereto a fluororubber composition comprising (A) 100 parts by weight of a polyol-vulcanizable fluororubber, (B) 10-50 parts by weight of amorphous graphite, (C) 1-15 parts by weight of a phenol resin, (D) 1-4 parts by weight of a silane coupling agent, (E) 0.5-8 parts by weight of a polyol-based vulcanizing agent, and (F) 0.5-6 parts by weight of a vulcanizing accelerator, followed by vulcanization of the fluororubber composition to form laminate, where the metallic sheet is free from either a chromating treatment or a chromating substitute treatment, is distinguished in characteristics such as sealability, compression resistance, air-heated aging resistance, anti-freezing liquid resistance, oil resistance, sticking resistance, abrasion resistance, etc.

10 Claims, No Drawings

# FLUORORUBBER-METAL LAMINATE SHEET

RELATED APPLICATION

This application is a 35 U.S.C. §371 national phase filing of International Patent Application No. PCT/JP2009/064905, filed Aug. 27, 2009, through which and to which priority is claimed under 35 U.S.C. §119 to Japanese Patent Application No. 2008-230514, filed Sep. 9, 2008.

TECHNICAL FIELD

The present invention relates to a fluororubber-metal laminate sheet, and more particularly a fluororubber-metal laminate sheet for use as effective automobile gaskets, etc.

BACKGROUND ART

A metal gasket comprising a bead sheet and a coating material provided thereon by coating the bead sheet with a rubber-mixed paint comprising 100 parts by weight of fluororubber, 50-200 parts by weight of an inorganic lubricant such as graphite, carbon, and molybdenum dioxide, and 4-16 parts by weight of a silane coupling agent, followed by vulcanization, has been so far proposed as a gasket metal sheet coated with a coating material capable of maintaining high slippability and non-stickiness for a long time without any breaking or peeling problem by controlling the rubber flow (see Patent Document 1).

The object of addition of the silane coupling agent contained in the proposed rubber-mixed paint is to control the rubber flow, that is, to increase the rubber stiffness, whereas the anti-freezing liquid resistance, or the long-term durabilities such as oil resistance, heat resistance, etc. are deteriorated. The inorganic filler showing low friction factor is hard to disperse, and the particle size of the filler is consequently larger, and particularly in cylinder head gaskets, etc. in the product rubber layer thickness as small as about 25 μm the seal surface is much roughened, giving an adverse effect on the sealability. Furthermore, when the proportion of admixed amine-containing silane coupling agent exceeds 4 parts by weight on the basis of 100 parts by weight of fluororubber, the pot life of the coating solution, i.e. the fluororubber-mixed paint, is considerably deteriorated, where the productivity is substantially lost.

In the gasket raw materials generally using rubber-metal laminate sheets, metallic sheets are used upon applying thereto a chromating treatment or a chromating substitute treatment (hexavalent Cr-free treatment, or non-chromating treatment such as iron phosphatizing treatment, zinc phosphatizing treatment, etc.). However, the chromating treatment involves an environmental load problem, and rubber-metal laminate sheets produced by application of a chromating substitute treatment for the metal sheet, followed by multi-layer coating also have a heavy environmental load from the total product side, in view of the complicated treating process, and further are costwise inadvantageous.

PRIOR ART DOCUMENT

Patent Document

Patent Document 1: JP-A-2004-68886
Patent Document 2: JP-A-61-12741

OUTLINE OF THE INVENTION

Problem to be Solved by the Invention

The object of the present invention is to provide a fluororubber-metal laminate sheet, which comprises a metallic sheet free from either chromating treatment or chromating substitute treatment, and a vulcanized fluororubber layer provided on the metallic sheet, and which is distinguished in various characteristics such as sealability, compression resistance, air-heated aging resistance, anti-freezing liquid resistance, oil resistance, sticking resistance, abrasion resistance, etc.

Means for Solving the Problem

The object of the present invention can be attained by a fluororubber-metal laminate sheet, which comprises a metallic sheet, and a vulcanized fluororubber layer provided on the metallic sheet by applying thereto a fluororubber composition comprising (A) 100 parts by weight of polyol-vulcanizable fluororubber, (B) 10-50 parts by weight of amorphous graphite, (C) 1-10 parts by weight of a phenol resin, (D) 1-4 parts by weight of a silane coupling agent, (E) 0.5-8 parts by weight of a polyol-based vulcanizing agent, and (F) 0.5-6 parts by weight of a vulcanization accelerator to the metallic sheet, followed by vulcanization of the fluororubber composition to form a laminate.

Effect of the Invention

The fluororubber composition for use in the formation of the present fluororubber-metal laminate sheet is characterized by:

(1) applying the fluororubber composition as a one-pot type coating agent to a non-chromating treatment metallic sheet, i.e. Cr-free, not based on a multi-layer coating type, i.e. less VOC discharge and smaller environmental load, and the process is not complicated, leading to processing cost reduction, (2) selectively using a specific graphite such as amorphous graphite, making the particle size to 20 μm or less easily in the rubber solution, i.e. distinguished in the surface smoothness and initial sealability, with less delamination between the layers and more distinguished in the non-stickiness than flaky graphite, i.e. distinguished in the reworkability, and (3) using the phenol resin and the silane coupling agent at the same time, i.e. ensuring the anti-freezing liquid resistance and the long-term durability such as oil resistance and heat resistance.

EMBODIMENTS FOR CARRYING OUT THE INVENTION

The metallic sheets for use in the present invention include surface-unroughened stainless steel sheets, SPCC steel sheets, aluminum sheets, etc. and surface-roughened stainless steel sheet, SPCC steel sheets, aluminum sheets, etc. by shot blasting, scotch blasting, hair-line finishing, dull finishing. Generally, solvent-defatted or alkali-defatted ones can be used as such. Metallic sheets having a thickness of about 0.1 to about 1 mm can be used for the gasket material application.

The polyol-vulcanizable fluororubber for use as Component (A) of the present fluororubber composition includes, for example, homopolymers of vinylidene fluoride, hexafluoropropene, pentafluoropropene, trifluoroethylene, trifluorochloroethylene, tetrafluoroethylene, vinyl fluoride, perfluoroacrylic acid ester, perfluoroalkyl acrylate, perfluoro(methyl vinyl ether), perfluoro(ethyl vinyl ether), perfluoro(propyl vinyl ether), etc.; their alternating copolymers or their copolymers with propylene. Preferable are vinylidene fluoride-hexafluoropropene copolymer, vinylidene fluoride-hexafluoropropene-tetrafluoroethylene terpolymer, tetrafluoroethylene-propylene copolymer, etc. Practically, commercially available polyol-vulcanizable fluororubber can be generally used as such.

The polyol-based vulcanizing agent of Component (E) for use as a vulcanizing agent for the polyol-vulcanizable fluororubber of Component (A) includes, for example, 2,2-bis(4-hydroxyphenyl)propane [bisphenol A], 2,2-bis(4-hydroxyphenyl)perfluoropropane [bisphenol AF], bis(4-hydroxyphenyl)sulfone [bisphenol S], 2,2-bis(4-hydroxyphenyl)methane [bisphenol F], bisphenol A-bis (diphenylphosphate), 4,4'-dihydroxydiphenyl, 2,2-bis(4-hydroxyphenyl)butane, etc. Preferable are bisphenol A, bisphenol AF, etc. They can be in the form of alkali metal salts or alkaline earth metal salts. The polyol-based vulcanizing agent can be used generally in a proportion of about 0.5 to about 8 parts by weight, preferably about 2 to about 6 parts by weight, on the basis of 100 parts by weight of polyol-vulcanizable fluororubber. The polyol-based vulcanizing agent can be also used as a master batch with the fluororubber.

The vulcanization accelerator for use as Component (F) in the present invention includes quaternary onium salts such as quaternary phosphonium salts or quaternary ammonium salts. Preferable are quaternary phosphonium salts. The onium salt can be used in a proportion of about 0.5 to about 6 parts by weight, preferably about 1 to about 4 parts by weight, on the basis of 100 parts by weight of polyol-vulcanizable fluororubber. The vulcanization accelerator can be also used as a master batch with the fluororubber.

The quaternary phosphonium salts are compounds represented by the following general formula:

[PR$_1$R$_2$R$_3$R$_4$]$^+$X$^-$ (where R$_1$ to R$_4$ are alkyl groups having 1-25 carbon atoms, alkoxyl groups, aryl groups, alkylaryl groups, aralkyl groups or polyoxyalkylene groups, two or three of which can form a heterocyclic group together with P, and X is an anion of Cl$^-$, Br$^-$, I$^-$, HSO$_4^-$, H$_2$PO$_4^-$, RCOO$^-$, ROSO$_2^-$, CO$_3^-$, etc.) and include, for example, tetraphenylphosphonium chloride, benzyltriphenylphosphonium bromide, benzyltriphenylphosphonium chloride, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethylphosphate, etc. The quaternary phosphonium salts can be equimolar molecular compounds with active hydrogen-containing aromatic compounds such as polyhydroxyaromatic compounds, etc., as disclosed in Patent Document 2.

The quaternary ammonium compounds are compounds represented by the following general formula:

[NR$_1$R$_2$R$_3$R$_4$]$^+$X$^-$ (where R$_1$-R$_4$ and X$^-$ are the same meanings as defined above) and include, for example, 1-alkylpyridinium salts, 5-aralkyl-1,5-diazabicyclo[4,3,0]-5-nonenium salts, 8-aralkyl-1,8-diazabicyclo[5,4,0]-7-undecenium salts, etc.

The amorphous graphite for use as Component (B) in the present invention can be recovered from carbon beds in the sedimentary rocks, etc. and has a good lubricability equivalent to that of other kinds of graphites, and also has a distinguished abrasion resistance. Furthermore, it has less delamination between layers and more distinguished non-stideyness than those of the flaky graphite, etc., and also has distinguished sealability and compression resistance as will be described later. The amorphous graphite can be used in a proportion of about 10 to about 50 parts by weight, preferably about 25 to about 40 parts by weight, on the basis of 100 parts by weight of polyol-vulcanizable fluororubber. When it is used in a proportion of less than about 10 parts by weight, the non-stickiness and the abrasion resistance will be deteriorated, whereas in a proportion of more than about 50 parts by weight the compression resistance and the abrasion resistance will be deteriorated.

The amorphous graphite having a maximum particle size of not more than 45 μm, and an average particle size of not more than 20 μm can be used. When other graphites than the amorphous graphite are used even on the same average particle size level, the dispersed particle size in the rubber solution will be increased, causing a sealability problem as well as a compression resistance problems.

The phenol resin for use as Component (C) includes, for example, novolak type phenol resin derived from p-substituted phenol, resol type phenol resin, epoxy-modified phenol resin, etc., and can be used in a proportion of about 1 to about 10 parts by weight, preferably about 3 to about 6 parts by weight, on the basis of 100 parts by weight of polyol-vulcanizable fluororubber. When the phenol resin is in a proportion of less than about 1 part by weight, the oil resistance and the air-heated aging resistance will be deteriorated, whereas in a proportion of more than about 10 parts by weight the abrasion resistance and the air-heated aging resistance will be deteriorated.

The phenol resin for use in the present invention will be exemplified below:

Novolak type phenol resin derived from p-alkyl-substituted phenol:

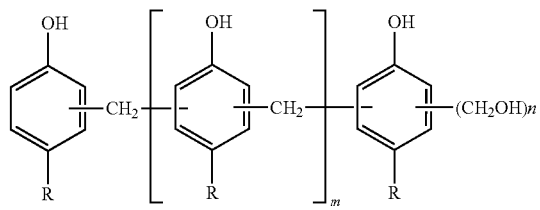

m: 4-5 n: about 0.1

Resol Type Phenol Resin:

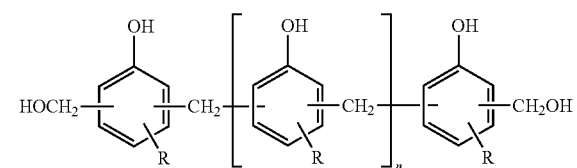

R: hydrogen atom, methyl group n: 1-6 (on average)

Epoxy-Modified Phenol Resin:

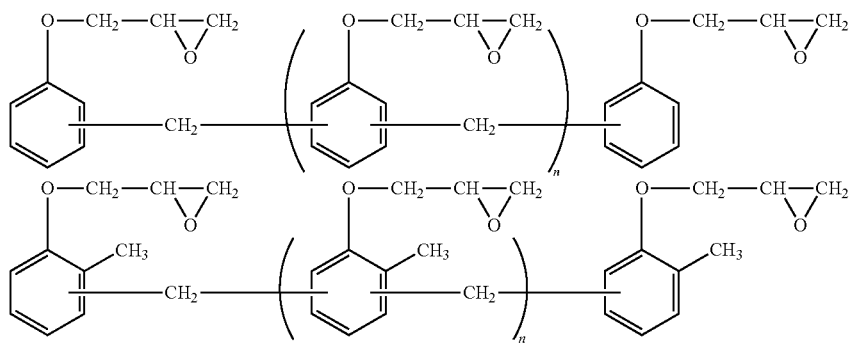

n: 1-6 (on average)

The silane coupling agent for use as Component (D) in the present invention includes, for example, amino group-containing alkoxysilanes such as γ-aminopropyltriethoxysilane, γ-aminopropyltrimethoxysilane, N-β-(aminoethyl)-γ-aminopropyltriethoxysilane, N-β-(aminoethyl)-γ-aminopropyltrimethoxysilane, etc. and vinyl group-containing alkoxysilanes such as vinyltriethoxysilane, vinyltrimethoxysilane, etc., and at least one of the amino group-containing alkoxysilanes and vinyl group-containing alkoxysilanes can be preferable used.

The silane coupling agent can be used in a proportion of about 1 to about 4 parts by weight, preferably about 2 to about 3 parts by weight, in terms of solid matters, on the basis of 100 parts by weight of polyol-vulcanizable fluororubber. When the silane coupling agent is in a proportion of less than about 1 part by weight, the compression resistance and the air-heated aging resistance will be deteriorated, whereas in a proportion of more than about 4 parts by weight the pot life will be considerably shortened, and the anti-freezing liquid resistance and the air-heated aging resistance will be deteriorated.

The fluororubber composition comprising the afore-mentioned essential compounds can further contain various fillers such as carbon black, silica, titanium oxide, alumina, iron oxide red, clay, calcium carbonate, PTFE powder, etc. From the viewpoint of reinforcement, carbon black, preferably MT carbon black or silica can be used. Furthermore, divalent metal oxides or hydroxides such as magnesium oxide, zinc oxide, calcium oxide, calcium hydroxide, etc., or basic magnesium-aluminum hydrooxycarbonate hydrate (hydrotalcite), etc. can be used as an acid acceptor.

The fluororubber composition appropriately containing any other necessary compounding ingredients can be prepared by kneading by a tightly sealed type kneading machine such as Intermix, a kneader, Banbury mixer, etc. or through open rolls, etc., where hydrocarbon-based wax, silicone-based wax, or the like can be used, if necessary, as a processing aid.

The fluororubber layer can be laminated on a metallic sheet generally by applying thereto the fluororubber composition as a one-pot type coating agent. The fluororubber coating solution can be prepared as an organic solvent solution having a solid matter concentration adjusted to about 20 to about 60 wt. %, preferably about 25 to about 50 wt. %, by dissolving or dispersing the fluororubber composition with the ordinary rotating type stirrer or a high shearing type dispersing machine such as a homogenizer, a ball mill, etc., and then with three-rolls, etc., where a commercially available silicone-based deforming agent can be used, if necessary.

The organic solvent for use preferably in the formation of a fluororubber coating solution as a one-pot type coating agent includes, for example, ketones such as methyl ethyl ketone, 2-butanone, di-n-propyl ketone, diisobutyl ketone, phorone, isophorone, cyclohexanone, etc., or alcohols such as methanol, ethanol, isopropanol, n-butanol, amyl alcohol, heptanol, etc. Mixed solvent of ketones and alcohols can be also used.

The organic solvent solution of fluororubber composition so prepared can be applied as one-pot type coating agent directly to the surface of a metallic sheet free from either chromating treatment or chromating substitute treatment to a desired coating thickness, preferably dried thickness of about 10 to about 100 μm, preferably about 20 to about 30 μm, by coating with a knife coater, a flow coater, a roll coater, etc., or by screen printing process, followed by drying and oven vulcanization at about 150° to about 230° C. for about 2 to about 30 minutes, thereby forming a fluororubber-metal laminate sheet.

A liquid dispersion comprising a lubricating component such as graphite, PTFE, molybdenum dioxide, carbon black, paraffin wax, etc. as the main component, and a binder such as cellulose resin, acrylic resin, polybutadiene resin, urethane resin, etc., as dispersed in an organic solvent such as toluene, etc., or water, can be applied to the vulcanized fluororubber layer by coating, if necessary, thereby forming a non-sticking layer having a thickness of about 1 to about 10 μm to prevent seizing or sticking.

EXAMPLE

The present invention will be described in detail below, referring to Examples.

Example 1

|  | Parts by weight |
|---|---|
| Fluororubber (Viton A-200, a product of DuPont) | 100 |
| MT carbon black (N990) | 20 |
| White carbon (Nipsil ER, a product of Toso-Silica Co.) | 10 |
| Amorphous graphite (A-O, a product of Nichiden Carbon Co,; max. particle size: 45 μm; average particle size: 13 μm) | 30 |

-continued

| | Parts by weight |
|---|---|
| Magnesium oxide (Magnesia #30, a product of Kyowa Chemical Co.) | 5 |
| Vulcanizing agent (Curative #30, a product of DuPont; bisphenol AF: 50 wt. %, and fluororubber (Viton E-45): 50 wt. %) | 4 |
| Vulcanization accelerator (Curative #20, a product of DuPont; organic phosphonium salt: 33 wt. %, and fluororubber (Viton F-45): 67 wt. %) | 2 |
| Silane coupling agent (APZ-6633, a product of Toray · Dow Corning) | 2.5 (in terms of solid matters) |
| Epoxy-modified phenol resin (Epiclon N695, a product of Dainippon Ink & Chemicals) | 4 |

The foregoing components except the vulcanization accelerator were kneaded together through a pressure kneader, thereafter discharging rubber compounds, and then mixed with the vulcanization accelerator through open rolls to give a rubber composition.

The rubber composition was dissolved into a mixed solvent of methyl ethyl ketone-methanol (9:1 by volume) with a rotating type stirrer to make a solid matter concentration 25 wt. %, thereby obtaining a rubber solution. The rubber solution was applied to a SUS301 metallic sheet (0.2 mm in thickness) free from any surface treatment except solvent defatting, using a flow coater to a dried thickness of 25 μm, followed by drying to evaporate off the solvent, and by vulcanization in an oven at 220° C. for 3 minutes, thereby obtaining a fluororubber laminated metallic sheet.

The resulting fluororubber-laminated metallic sheet was subjected to tests to determine the following items Sealability (Product Surface Smoothness):

When an air pressure of 0.15 MPa was applied to the fluororubber-laminated metallic sheet in the form of a gasket, sealability was evaluated as follows: a leaked air volume rate of less than 5 ml/min. was marked as "○", that of 5 to less than 10 ml/min. as "Δ", and that of 10 ml/min. or more as "X"

Compression Resistance Test (Rubber Flowability):

When a stainless steel projection was allowed to press against the fluororubber-laminated metallic sheet at 150° C. and a surface pressure of 2-4 tons/cm$^2$ (196-392 MPa) for 5 minutes, the resulting compressed rubber flow state was evaluated with the following 5 grades, where 4th-5th grades were marked as "○", 3rd grade as "Δ", and 2nd and 1st grade as "X"

5th grade: no metal exposure without substantial rubber flow
  4th grade: no metal exposure with a small rubber flow
  3rd grade: no metal exposure with an intermediate rubber flow (i.e. an appreciable rubber flow took place without any metal exposure, in other words, no such a large rubber flow as to cause metal exposure took place)
  2nd grade: small metal exposure with a large rubber flow
  1st grade: large metal exposure with a large rubber flow Air-heated Aging Resistance Test:

The fluororubber-laminated metal sheet was exposed to air at 200° C. for 72 hours in a gear type oven, followed by a cross-cut test according to JIS K5400 corresponding to ASTM D3002, where the peeling degree of rubber layer was evaluated with the following 5 grades, and 4th and 5th grades were marked as "○", 3rd grade as "Δ", and 2nd and 1st grades as "X"

5th grade: 100% remaining rubber
  4th grade: less than 100% to 95% or more remaining rubber
  3rd grade: less than 95% to 85% or more remaining rubber
  2nd grade: less than 85% to 65% or more remaining rubber
  1st grade: less than 65% remaining rubber Anti-freezing Liquid Resistance Test:

The fluororubber-laminated metallic sheet was dipped into water in a pressure vessel at 150° C. for 100 hours, followed by the same cross-cut test and evaluation as in the air-heated aging resistance test Oil Resistance Test:

The fluororubber-laminated metallic sheet was dipped into IRM903 oil at 200° C. for 15 hours, followed by the same cross-cut test and evaluation as in the air heated aging resistance test Sticking Test (Reworkability):

An aluminum-steel sheet was allowed to press against the fluororubber-laminated metallic sheet at 150° C. and a surface pressure of 0.5 tons (49 MPa) for 10 minutes in the same manner as in the compression resistance test, followed by cooling and evaluation of peeled state of the rubber layer, where less than 10% rubber sticked to the aluminum steel sheet was marked as "○", 10-50% as "Δ", and 50-100% (complete sticking) as "X"

Abrasion Resistance Test:

The fluororubber-laminated metallic sheet was subjected to a Taber abrasion test according to JIS K6264 corresponding to ASTM D5963, where an abrasion volume loss of less than 0.2 ml was marked as "○", as abrasion resistance, that of 0.2-0.5 ml as "Δ", and that of 0.5 ml or more as "X"

In these tests, mark "○", means a very satisfactory level, "Δ" no substantial performance problem, and "X" a substantial performance problem Example 2

In Example 1, the amount of amorphous graphite was changed to 10 parts by weight.

Example 3

In Example 1, the amount of amorphous graphite was changed to 50 parts by weight.

Example 4

In Example 1, the amount of silane coupling agent was changed to 1 part by weight (in terms of solid matters).

Example 5

In Example 1, the amount of silane coupling agent was changed to 4 parts by weight (in terms of solid matters).

Example 6

In Example 1, the amount of epoxy-modified phenol resin was changed to 1 parts by weight.

Example 7

In Example 1, the amount of epoxy-modified phenol resin was changed to 15 parts by weight.

Comparative Example 1

In Example 1, the same amount of flaky graphite (C-1, a product of Nichiden Carbon Co., average particle size 11 μm) was used in place of amorphous graphite.

Comparative Example 2

In Example 1, the same amount of flake graphite (HOP, a product of Nippon Graphite Co., average particle size 3 μm) was used in place of amorphous graphite.

Comparative Example 3

In Example 1, no amorphous graphite was used.

Comparative Example 4

In Example 1, the amount of amorphous graphite was changed to 100 parts by weight.

Comparative Example 5

In Example 1, no silane coupling agent is used.

Comparative Example 6

In Example 1, the amount of silane coupling agent was changed to 16 parts by weight (in terms of solid matters).

Comparative Example 7

In Example 1, no epoxy-modified phenol resin was used.

Comparative Example 8

In Example 1, the amount of epoxy-modified phenol resin was changed to 30 parts by weight.

Results of the foregoing Examples and Comparative Examples are shown in the following Table.

TABLE

| Example | Sealability | Compression resistance test | Air-heated aging resistance test | Anti-freezing liquid resistance test | Oil resistance test | Sticking test | Abrasion resistance test |
|---|---|---|---|---|---|---|---|
| Ex. 1 | ○ | ○ | ○ | ○ | ○ | ○ | ○ |
| Ex. 2 | ○ | ○ | ○ | ○ | ○ | Δ | Δ |
| Ex. 3 | ○ | Δ | ○ | ○ | ○ | Δ | Δ |
| Ex. 4 | ○ | Δ | Δ | Δ | ○ | ○ | ○ |
| Ex. 5 | ○ | ○ | Δ | Δ | ○ | Δ | Δ |
| Ex. 6 | ○ | ○ | Δ | Δ | Δ | Δ | Δ |
| Ex. 7 | ○ | Δ | Δ | ○ | ○ | ○ | Δ |
| Comp. Ex. 1 | X | X | ○ | ○ | ○ | ○ | ○ |
| Comp. Ex. 2 | X | X | ○ | ○ | ○ | ○ | ○ |
| Comp. Ex. 3 | ○ | ○ | ○ | ○ | ○ | X | X |
| Comp. Ex. 4 | ○ | X | ○ | ○ | ○ | Δ | X |
| Comp. Ex. 5 | ○ | X | X | Δ | ○ | ○ | ○ |
| Comp. Ex. 6 | ○ | ○ | X | X | ○ | Δ | Δ |
| Comp. Ex. 7 | ○ | ○ | X | Δ | X | Δ | Δ |
| Comp. Ex. 8 | ○ | X | X | ○ | ○ | ○ | X |

The invention claimed is:

1. A fluororubber-metal laminate sheet, which comprises a metallic sheet and a vulcanized fluororubber layer provided on the metallic sheet by applying thereto a fluororubber composition comprising (A) 100 parts by weight of a polyol-vulcanizable fluororubber, (B) 10-50 parts by weight of amorphous graphite, (C) 3-6 parts by weight of a phenol resin, (D) 1-4 parts by weight of a silane coupling agent, (E) 0.5-8 parts by weight of a polyol-based vulcanizing agent, and (F) 0.5-6 parts by weight of a vulcanization accelerator, followed by vulcanization of the fluororubber composition to form laminate.

2. A fluororubber-metal laminate sheet according to claim 1, wherein the metallic sheet is a metallic sheet free of chromating treatment or non-chromating treatment.

3. A fluororubber-metal laminate sheet according to claim 2, wherein the metallic sheet free from of chromating treatment or non-chromating treatment is a solvent-defatted or alkali-defatted metallic sheet.

4. A fluororubber-metal laminate sheet according to claim 1, wherein the amorphous graphite in the fluororubber composition has a max. particle size of not more than 45 μm and an average particle size of not more than 20 μm.

5. A fluororubber-metal laminate sheet according to claim 1, wherein the phenol resin in the fluororubber composition is an epoxy-modified phenol resin.

6. A fluororubber-metal laminate sheet according to claim 1, wherein the vulcanizing accelerator in the fluororubber composition is a quaternary onium salt selected from a quaternary phosphonium salt and a quaternary ammonium salt.

7. A fluororubber-metal laminate sheet according to claim 1, wherein the fluororubber composition is used as a one-pot type coating agent.

8. A fluororubber-metal laminate sheet according to claim 7, wherein the one-pot coating agent has a solid matter concentration of 20-60 wt %.

9. A fluororubber-metal laminate sheet according to claim 1, wherein a non-sticking layer is provided on the vulcanized fluororubber layer.

10. A fluororubber-metal laminate sheet according to claim 1, wherein the phenol resin in the fluororubber composition is a novolak type phenol resin derived from a p-alkyl-substituted phenol, or a resol type phenol resin.

* * * * *